(12) United States Patent
Teshima et al.

(10) Patent No.: US 7,088,093 B2
(45) Date of Patent: Aug. 8, 2006

(54) MAGNETIC ENCODER, AND BEARING UNIT WITH ATTACHED MAGNETIC ENCODER

(75) Inventors: Naoto Teshima, Okayama (JP); Hironori Yamamoto, Okayama (JP)

(73) Assignee: Uchiyama Manufacturing Co., Okayama (JP)

( * ) Notice: Subject to any disclaimer, the term of this patent is extended or adjusted under 35 U.S.C. 154(b) by 121 days.

(21) Appl. No.: 10/747,681

(22) Filed: Dec. 30, 2003

(65) Prior Publication Data
US 2004/0239532 A1    Dec. 2, 2004

(30) Foreign Application Priority Data
Jan. 8, 2003    (JP) ............... 2003-002610

(51) Int. Cl.
*G01P 3/48* (2006.01)
*G01P 3/54* (2006.01)
(52) U.S. Cl. .................................... 324/174
(58) Field of Classification Search ........... 324/207.25, 324/160, 173, 174; 384/448; 335/296, 302; 310/154.01, 152; 277/317
See application file for complete search history.

(56) References Cited

U.S. PATENT DOCUMENTS

| | | | | |
|---|---|---|---|---|
| 5,382,098 A | * | 1/1995 | Rigaux et al. | 384/448 |
| 5,407,213 A | * | 4/1995 | Ouchi et al. | 277/317 |
| 6,232,772 B1 | * | 5/2001 | Liatard et al. | 324/207.25 |
| 6,593,733 B1 | * | 7/2003 | Nicot | 324/207.25 |
| 6,682,221 B1 | * | 1/2004 | Rutter et al. | 384/448 |
| 6,692,153 B1 | * | 2/2004 | Ohtsuki et al. | 384/448 |
| 6,789,948 B1 | * | 9/2004 | Nakajima | 384/448 |
| 6,906,509 B1 | * | 6/2005 | Tomioka | 324/174 |
| 2002/0140418 A1 | * | 10/2002 | Ichiman | 324/174 |

* cited by examiner

*Primary Examiner*—Bot Ledynh
*Assistant Examiner*—Kenneth J. Whittington
(74) *Attorney, Agent, or Firm*—Bacon & Thomas, PLLC

(57) ABSTRACT

A magnetic encoder is mounted on a bearing unit and comprises a reinforcing ring and a multi-pole magnet for detecting the rotation speed thereof. The multi-pole magnetic is attached to the outside surface of the reinforcing ring, and a peelable protective cover formed from magnetic rubber or the like is attached to the surface of the multi-pole magnet. A handle is provided to facilitate operation.

9 Claims, 2 Drawing Sheets

MAGNETIC ENCODER, AND BEARING UNIT WITH ATTACHED MAGNETIC ENCODER

BACKGROUND OF THE INVENTION

1. Field of the Invention

The present invention relates to a rotation speed detecting structure for a bearing that performs relative rotation and, more specifically, relates to a magnetic encoder for detecting the rotation speed and to a bearing unit with the attached magnetic encoder.

2. Description of the Related Art

[Patent Literature 1] Japanese Patent Application laid-open No. 2002-286739

In conventional practice, bearing units for automobile wheels and the like are equipped with a wheel rotation speed detecting apparatus for preventing differences in rotation among a plurality of wheels, and the following type of structure is widely used for this detecting apparatus.

Specifically, a rotation speed detecting apparatus has a pulse generating rotor and a sensor for sensing the pulse, and a rotation speed detector wherein a pulse generating encoder with a multi-pole magnet is disposed in the radial part of a reinforcing ring and wherein a sensor is provided near the pulse generating encoder has been developed and put into practical use as a common structure thereof. In many cases, such a pulse generating encoder or, in other words, a magnetic encoder, is combined with a seal member having seal lips in order to efficiently utilize the narrow space of the bearing unit.

The invention is described in further detail below with reference to the diagrams.

One embodiment of such a conventional example will now be described with the aid of a diagram. As shown in FIG. 4, a bearing unit structure is used in which a multi-pole magnet 3 is attached to a reinforcing ring 2 fitted into an inner wheel 1b to form a magnetic encoder E, and in which the rotation of the multi-pole magnet 3 is sensed and detected with a rotation speed detecting sensor 4. A structure combined with a seal member S is shown here, and the bearings 1a, 1b are protected from the ingress of moisture or foreign matter by the seal lips 5 of the seal member S being in frictional contact with the inner peripheral surface of the reinforcing ring 2.

In the multi-pole magnet 3 of such a magnetic encoder E, however, the N/S poles are subjected to multi-polar magnetization in a circumferential manner, so extreme caution must be taken during handling to prevent contact with magnetized granular materials, parts that have a magnetic force, or the like until the magnet is mounted on the bearings 1a, 1b, and safety must be ensured during storage as well. In addition, inconveniences arise in the sense that the reinforcing rings 6 of other seal members S become magnetized and are difficult to pull out during stacked storage.

Because of such conditions, iron sand and other such foreign matter tend to adhere to the surface of the multi-pole magnet 3 during regular handling, and in the event that foreign matter enters and adheres between the multi-pole magnet 3 and the rotation speed detecting sensor 4, the rotation speed detecting apparatus develops fatal flaws in that the multi-pole magnet 3 is caused to generate signal errors by the foreign matter and is damaged or otherwise affected by the foreign matter biting into the magnet during rotation, creating errors in rotation speed detection.

In view of the above and in order to prevent this situation from occurring, structures are being developed in which a synthetic resin cap or a metal cover (neither are shown in the diagrams) is temporarily attached or crimped on so as to cover the surface of the multi-pole magnet 3, but this approach is disadvantageous in that in the first case, which involves the synthetic resin cap, the multi-pole magnet 3 cannot be protected until the final step because of the need to remove the cap when a knuckle is inserted, and in the second case, which involves the metal cover, numerous manufacturing steps are performed and high costs are entailed.

In view of such drawbacks, it is therefore a first object of the invention to provide a magnetic encoder equipped with a protective apparatus wherein the pulse generator is completely protected and the sensing capabilities and durability are remarkably improved.

It is a second object of the invention to provide a bearing unit with an attached magnetic encoder that is obtained by incorporating the magnetic encoder mentioned above as the present invention, which is equipped with a protective apparatus wherein the pulse generator is completely protected and the sensing capabilities and durability are remarkably improved.

SUMMARY OF THE INVENTION

The magnetic encoder of the invention is provided, as is a bearing unit with the attached magnetic encoder, in order to attain the first (*1) object. Here, the magnetic encoder of this invention is mounted on the bearing of a bearing unit and is structured from a reinforcing ring and a multi-pole magnet for detecting the rotation speed of the bearing, and has a structure in which a peelable protective cover is affixed to the surface of the multi-pole magnet formed on the outside surface of the reinforcing ring, whereby the protective cover is removed from the surface of the multi-pole magnet after the magnetic encoder with the attached protective cover has been mounted on the bearing unit, as shown in FIG. 1.

In affixing the multi-pole magnet and the protective cover together, it is possible to form a magnetized structure or other structure wherein the protective cover is formed from magnetic rubber and made to adhere to the multi-pole magnet by its own magnetic force; and there are also affixation methods wherein the protective cover is formed from synthetic rubber, synthetic resin, or the like, and is merely bonded using a peelable bonding agent.

In the case of a protective cover formed from magnetic rubber as previously described, the protective cover can be removed together with any iron powder or other matter adhering to its surface during peeling by unipolar or multi-polar magnetization into a magnet.

As another embodiment, the invention also includes an arrangement in which a film-shaped protective cover made from synthetic rubber or synthetic resin is formed on the surface of a multi-pole magnet formed on the outside surface of a reinforcing ring constituting a magnetic encoder, as shown in FIG. 4.

DESCRIPTION OF THE PREFERRED EMBODIMENTS

The invention provides excellent action by virtue of the above-described structure, as shown below.

Specifically, the magnetic encoder E fixedly mounted on the bearings 1a, 1b is equipped with a pulse-generating multi-pole magnet 3 on the outside surface of a reinforcing ring 2, and the multi-pole magnet 3 is covered by a protective cover 7 located on its external side. For this reason, there is no effect at all from the outside; the multi-pole magnet 3 herein is completely protected from external impact, the adhesion of iron powder, or the like; and the magnetic encoder E is mounted on the bearings 1a, 1b in a completed state.

Figure 4:
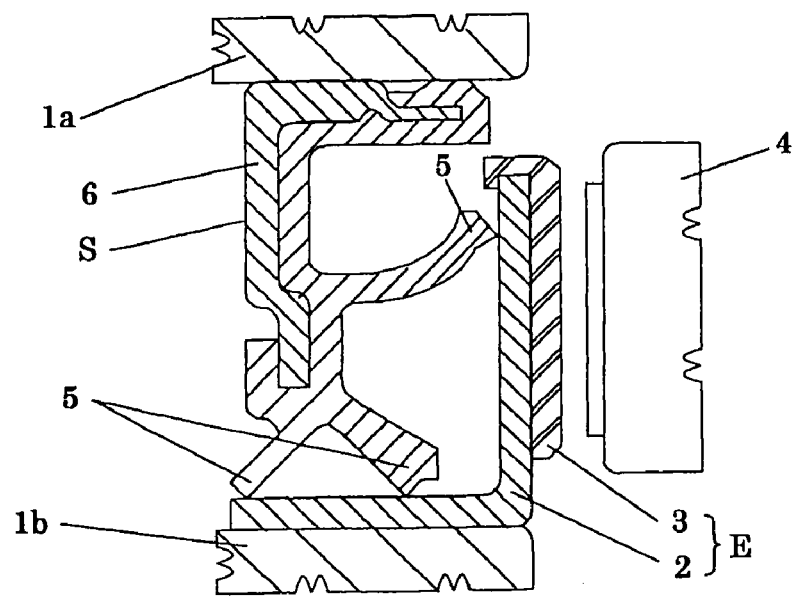
FIG. 4 is a cross-sectional view showing a conventional example that does not use the invention.

When the protective cover 7 is peeled off from the surface of the multi-pole magnet 3 after being thus mounted, the multi-pole magnet 3 is returned to an initial state in which the magnetic poles are aligned and high-precision magnetization is ensured. At this time, it is possible to remove the protective cover 7 after the rotation speed detecting sensor (4, the same sensor as the one shown in FIG. 4) has been placed nearby to form a rotation speed detecting apparatus, and rotation detecting capabilities with a higher degree of precision can be provided.

EXAMPLES

The multi-pole magnet 3 in the invention can be selected from a bonded magnet, cast magnet, sintered magnet, or other magnet formed by mixing magnetic material with rubber or plastic; and ferrite, rare earths, MK steel, Alnico, or the like can be employed as the magnetic material for forming the magnet.

The protective cover 7 for covering the multi-pole magnet 3 can be molded with a structure wherein a ferromagnetic material is mixed in a similar manner as the multi-pole magnet 3 to form magnetic rubber, or with a simple cover structure formed solely from synthetic rubber, synthetic resin, or the like, but a protective cover 71 employing a thin film can also be used, and in addition to affixing and forming a protective cover in advance with a film-shaped protective cover 71, a protective film can also be formed by directly coating the multi-pole magnet 3 with a liquid material and curing the resulting coating.

Figure 1:
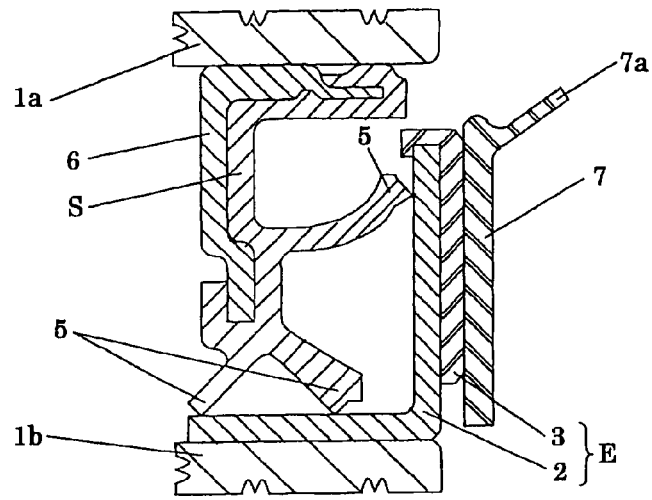
FIG. 1 is a cross-sectional view showing an example of the invention.
Figure 2:
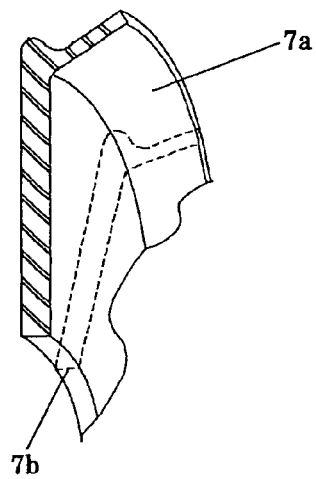
FIG. 2 is a cross-sectional view showing a detail of an example of the invention.
Figure 3:
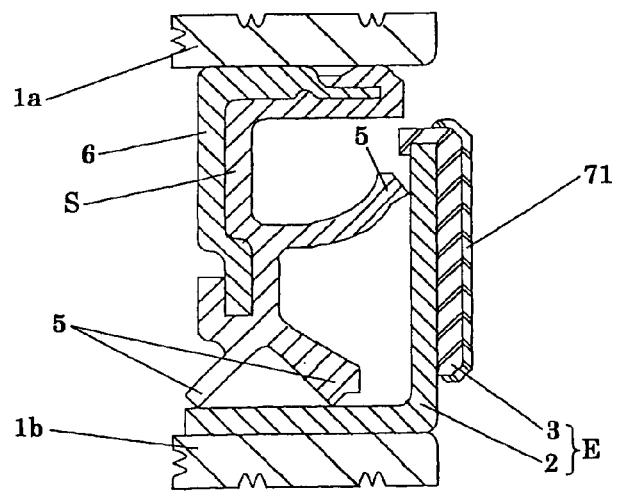
FIG. 3 is a cross-sectional view showing another example of the invention.

The outer side of the protective cover 7 may be provided with a handle 7a, as shown in FIGS. 1 and 2, to facilitate removal of the protective cover 7 from the multi-pole magnet 3. When part of the protective cover 7 (*2) is provided with a cut, incision, or other such weakened part 7b, the protective cover 7 (*2) can easily be removed by fracturing the weakened part 7b during such removal. The handle 7a is shown here as being set in the outer side as in FIGS. 1 and 2, but its location may also be in the inner side, the middle, or the like, and this location can be selected according to the means of removal and the alignment of assembly.

Since a thin film can be formed in the arrangement in which a protective cover 71 composed of a protective film is used, there is no adverse effects on the gap formed by the rotation speed detecting sensor (4, the same sensor as the one shown in FIG. 4), and the magnetic encoder can be used in unaltered form without removing the protective cover. The protective covers 7 and 71 (*3) can also be colored, and can be efficiently distinguished as to mounting location, direction of insertion, size, and model number by coloring with various types of color coding (including coating and marking).

The magnetic encoder E provided with the protective covers 7 and 71 (*3) utilizes available space efficiently when mounted in combination with a seal member S having seal lips 5, and in terms of mounting operability, the attachment step can be eliminated to reduce assembly costs.

According to the invention, it is possible to provide a consistently stable magnetic encoder in which the multi-pole magnet 3 for generating a rotation pulse is completely shielded from outside air by a protective cover 7 or 71 attached to the outside, and in which any impact, adhesion of iron powder, or the like is prevented, and to provide a bearing unit with an attached magnetic encoder into which this magnetic encoder is incorporated.

Consequently, it is only when accurate magnetic poles are preserved in such a manner until a multi-polar magnet is mounted on a bearing unit that satisfactory sensing capabilities can be displayed by the rotation speed detecting sensor 4, and rotation can be detected with a high degree of precision.

Also, removing the protective cover 7 or 71 after the magnetic encoder E has been mounted at a specific location allows any deposited foreign matter, iron powder, and the like to be directly removed along with the protective cover 7 or 71, and an extremely clean state to be maintained, so the desired rotation detection capabilities can be preserved for long periods of time in accordance with design specifications.

What is claimed is:

1. A magnetic encoder mounted on a bearing unit, comprising:
   a reinforcing ring; and
   a multi-pole magnet for detecting the rotation speed thereof, wherein:
   said multi-pole magnet is attached to the outside surface of said reinforcing ring, and
   a protective cover made of magnetic rubber is adhesively and peelably attached to the surface of said multi-pole magnet by magnetic force attraction therebetween.

2. The magnetic encoder according to claim 1, wherein: said protective cover is provided with a handle.

3. The magnetic encoder according to claim 1, wherein: said multi-pole magnet is attached to the outside surface of said reinforcing ring, and a film-shaped protective cover is attached to the surface of said multi-pole magnet.

4. The magnetic encoder according to claim 3, wherein: said protective cover is colored.

5. The magnetic encoder according to claim 1, wherein: said protective cover is made of magnetic rubber which was previously magnetized.

6. The magnetic encoder according to claim 1, wherein: said protective cover is colored for discriminating its species.

7. A bearing unit with an attached magnetic encoder mounted on the bearing unit, comprising:
- a reinforcing ring, and
- a multi-pole magnet for detecting the rotation speed thereof, wherein:
- said multi-pole magnet is attached to the outside surface of said reinforcing ring, and a protective cover made of magnetic rubber is adhesively and peelably attached to the surface thereof; and
- said protective cover is adapted to be removed from the surface of said multi-pole magnet after the magnetic encoder has been mounted on the bearing unit.

8. The bearing unit with an attached magnetic encoder according to claim 7, wherein:

said protective cover is provided with a handle.

9. The bearing unit with an attached magnetic encoder according to claim 7, wherein:

said magnetic encoder is combined with a seal member having seal lips, and is mounted on the bearing unit.

* * * * *